US008893231B2

(12) United States Patent
Pandey et al.

(10) Patent No.: US 8,893,231 B2
(45) Date of Patent: Nov. 18, 2014

(54) MULTI-ACCESS AUTHENTICATION IN COMMUNICATION SYSTEM

(75) Inventors: Ravi Pandey, Masala (FI); Roman Pichna, Espoo (FI); Hannu Tuominen, Kauniainen (FI)

(73) Assignee: Nokia Corporation, Espoo (FI)

( * ) Notice: Subject to any disclaimer, the term of this patent is extended or adjusted under 35 U.S.C. 154(b) by 1254 days.

(21) Appl. No.: 11/702,100

(22) Filed: Feb. 5, 2007

(65) Prior Publication Data

US 2008/0120694 A1    May 22, 2008

Related U.S. Application Data

(60) Provisional application No. 60/859,293, filed on Nov. 16, 2006.

(51) Int. Cl.
*H04L 29/06* (2006.01)

(52) U.S. Cl.
USPC .............................................................. 726/3

(58) Field of Classification Search
None
See application file for complete search history.

(56) References Cited

U.S. PATENT DOCUMENTS

| | | | | |
|---|---|---|---|---|
| 6,671,507 B1* | 12/2003 | Vinck | ............................ | 455/411 |
| 7,089,009 B1* | 8/2006 | Fauconnier | .................... | 455/445 |
| 7,149,895 B1* | 12/2006 | Asokan et al. | ................. | 713/159 |
| 7,310,307 B1* | 12/2007 | Das et al. | ....................... | 370/229 |
| 2004/0077335 A1* | 4/2004 | Lee et al. | ....................... | 455/410 |
| 2004/0090930 A1* | 5/2004 | Lee et al. | ........................ | 370/328 |
| 2004/0185899 A1 | 9/2004 | Hayem et al. | .............. | 455/552.1 |
| 2005/0079866 A1* | 4/2005 | Chen et al. | .................. | 455/435.1 |
| 2005/0113070 A1* | 5/2005 | Okabe | ........................... | 455/411 |
| 2006/0003765 A1* | 1/2006 | Patil et al. | ................... | 455/432.1 |
| 2007/0150480 A1 | 6/2007 | Hwang et al. | .................... | 707/10 |
| 2008/0072301 A1 | 3/2008 | Chia et al. | ...................... | 726/8 Q |
| 2008/0194232 A1* | 8/2008 | Muratore et al. | ............. | 455/411 |
| 2009/0052396 A1 | 2/2009 | Bucker et al. | .................. | 370/331 |

FOREIGN PATENT DOCUMENTS

| | | |
|---|---|---|
| EP | 1 746803 A1 | 1/2007 |
| WO | WO-99/16266 A | 4/1999 |
| WO | WO-2006/116912 A1 | 9/2006 |

OTHER PUBLICATIONS

"Telecommunications and Internet converged Services and Protocols for Advanced Networking (Tispan); NGN Functional Architecture; Network Attachment Sub-system (NASS); ETSI ES 282 004." vol. TISPAN, No. V111, Jun. 2006, XP014037127.
ETSI TR 182 005 v1.1.2; "Telecommunications & Internet Converged Services & Protocols for Advanced Networking (TISPAN), Organization of User Data", Jun. 2006; pp. 1-14.

* cited by examiner

*Primary Examiner* — David Le
(74) *Attorney, Agent, or Firm* — Harrington & Smith

(57) ABSTRACT

A local attachment element in an access domain is configured to perform a fast authentication procedure without involving a centralized attachment element in a core network domain. Stated in other words, there is provided a regional authentication concept for any access in a multi-access environment.

32 Claims, 7 Drawing Sheets

MULTI-ACCESS AUTHENTICATION IN COMMUNICATION SYSTEM

FIELD OF THE INVENTION

The present invention relates to multi-access authentication in communication systems. In particular, the present invention relates to extended network attachment and authentication functionality in multi-access environments.

BACKGROUND OF THE INVENTION

In recent years, communication technology has widely spread in terms of number of users and amount of use of the telecommunication services by the users. This also led to an increase in the number of different technologies and technological concepts in use, which relates both to core network parts and to access network parts of communication systems.

In particular, a trend of convergence in the field of communication systems leads to multi-access environments, in which a plurality of different accesses (i.e. access types, technologies and/or networks) are available. That is, a user (or user equipment) may get attached to a communication system (e.g. to connect to a core or service network) via any one of a plurality of access options available.

A first example for a multi-access environment as currently known is based on the TISPAN (Telecommunication and Internet Converged Services and Protocols for Advanced Networking) approach by ETSI (European Telecommunications Standards Institute). The TISPAN approach provides for inter-operable and inter-domain support of mobility, roaming and multiple services in all-IP (IP: Internet Protocol) networks.

In TISPAN, a centralized element arranged in the core network part is responsible for performing address allocation, AAA functions (AAA: authentication, authorization and accounting), location (mobility) management and access network configuration. This element is usually referred to as network attachment subsystem NASS. The NASS element may also be distributed between a visited network (hereinafter referred to as access domain) and a home network (hereinafter referred to as core or service network).

The main functions and interfaces of a network attachment subsystem (NASS) element as defined in current TISPAN specifications are presented in FIG. 1 of the accompanying drawings. As can be seen in FIG. 1, a user equipment is connected to a NASS element via interface e3, and the NASS element is connected to a core network part of the communication system via interface e2. Furthermore, the NASS element is connected to a resource and admission control subsystem (RACS) via interface e4. As FIG. 1 merely serves as a general overview of TISPAN architecture with respect to a NASS element, and the individual functional blocks depicted are considered to be well-known for a person skilled in the field of mobile communications, a detailed description thereof is omitted herein. Reference is made to the list of abbreviations at the end of this specification.

The main functions of a NASS element may be summarized as follows: dynamic provision of IP (Internet Protocol) address and other user equipment configuration parameters (e.g., using dynamic host configuration protocol DHCP); user authentication, prior or during IP address allocation; user authentication based on a user network profile (for example based on point-to-point protocol PPP, hypertext markup language HTML, wireless communications according to IEEE 802.11X standards, protocol for carrying authentication for network access (PANA) of the Internet Engineering Task Force IETF), line authentication based on layer 2 (of ISO OSI reference model) line identification, location management (e.g. for emergency call, etc.), customer premises equipment (CPE) configuration, and P-CSCF (proxy call session control function) announcement.

In detail, the block level functions of a NASS element are the following. A Network Address Configuration Function (NACF) serves for IP address allocation to CPE, for distribution of other network configuration parameters such as address of DNS (domain name system) server(s), address of signalling proxies for specific protocols (e.g., P-CSCF). The NACF function is typically implemented as RADIUS (Remote Authentication Dial-In User Service) servers or DHCP (Dynamic Host Configuration Protocol) servers. An Access Management Function (AMF) serves for translating network access signalling between CPE and NACF/UAAF and for forwarding requests to the UAAF (User Access Authorization Function) to authenticate the user, authorize/deny network access and retrieve user-specific access configuration parameters. The AMF function is typically implemented as RADIUS client, if the NACF is implemented as RADIUS server. A Connectivity Session Location Repository Function (CLF) serves for registering an association between the IP configuration of the CPE and access transport characteristics, line identifier, IP edge identity, geographical location, etc. Further, it the CLF function serves for providing user network profile information to the RACS and for providing location information to TISPAN network core subsystems. The UAAF serves for performing user authentication and authorisation based on user profiles, and for collecting accounting data. A Profile Database Function (PDBF) serves for storing the user network profile containing user identity, supported authentication methods and keys. The PDBF function may be co-located with the User Profile Server Function (UPSF). A Customer Network Gateway Configuration Function (CNGCF) serves for providing a customer network gateway (CNG) with additional initial configuration information (firewall, DiffServ packet marking, etc.).

A second example for a multi-access environment as currently known is based on an approach of the Third Generation Partnership Project (3GPP). Although no element such as a NASS according to TISPAN exists in the 3GPP approach, there exist similarities, for example that there are needs to authenticate and authorize users to use different types of accesses and services. However, a common functionality for service authorization and policy and session management (such as realized by interfaces e2 and e4 of a TISPAN NASS element) is missing in the 3GPP approach.

Nevertheless, in 3GPP there are AAA servers present in the architecture, which serve for authentication and obtaining user profiles related to a certain service. Just as in the TISPAN approach, these AAA servers performing AAA functions are arranged in a core network part of an underlying communication system.

That is, in both conventional multi-access environments as set out above, there exists a centralized (i.e. core network based) authentication and mobility management functionality.

Hence, access type changes due to user mobility (i.e. roaming) are visible in the home (core) network of the user. Therefore, the home network (e.g. NASS) returns in an initial network authentication all parameters that are required (i.e. keying material, quality-of-service parameters) for network attachment for all supported access types.

When the access type changes are visible to the home network such as in known approaches, this leads to following disadvantages. First, there exists a considerable signaling delay e.g. for authentication functions. The signaling delay may prevent handovers to be seamless which is however desired in view of high user mobility. Second, the signaling load at a centralized AAA and mobility management element (e.g. NASS or AAA server) increases heavily causing expensive implementation and possibly processing overload resulting in service degradation or even outage.

In view of the above it is evident that, with current authentication methods, an access domain/type requests a home subscriber system HSS or a home location register HLR to provide authentication vectors each time per access node. Once a user moves out of the area of the current access node, unused authentication vectors are never used.

Taking an example: A user at home uses DSL, in morning goes to the office using 2G/3G access mobility, in office he/she uses WLAN. At the end of the day, he/she goes home using 2G/3G mobility and back home DSL network. This leads to in total four inter-access handovers (i.e. DSL->2G/3G->WLAN->2G/3G->DSL), and hence several authentications in different access domains. Each such authentication causes signaling to the core network part, being liable to delay and load restrictions.

A migration to multi-access domains in future communication systems means that even more access authentication is needed, hence more communication bandwidth would be needed when using current authentication methods and/or architectures.

Accordingly, a solution for multi-access environments is required, which is able to prevent access type changes from being visible in the home (core) network.

SUMMARY OF THE INVENTION

Hence, it is an object of the present invention for example that it may remove at least some of the above drawbacks and provide a solution for multi-access authentication in communication systems.

According to several aspects of the present invention, this object may be for example accomplished by methods, systems, apparatus and/or elements, computer programs, and conceptual implementations as set out in the following.

Stated in more general terms, embodiments of the present invention provide for a regional authentication concept for any access in a multi-access environment.

By virtue of aspects of the present invention, as explained above, at least one of the following effects may be achieved.

An effective attachment solution in a convergence area for a multi-access authentication may be provided.

Both AAA and mobility management functions may be decentralized.

Such a decentralization of authentication and mobility management may reside in a further benefit in that resources are liberated from a centralized node, thus making it possible to handle events relating to service authentication with more resources and/or in a higher number.

An autonomous AAA and mobility management functionality may be achieved.

A fast (re-)authentication may be achieved for any access type, which may furthermore be independent of mobility and access changes.

A signaling optimization both in terms of signaling delay and signaling time may be achieved towards the core network.

The core network (e.g. home subscriber system) may be disburdened, thus reducing processing load, in that only authentication vectors with respect to a decentralized unified attachment solution (UAS) are to be generated, and not with respect to each access node and each access type.

A common decentralized element may be provided at (regional) sites of access domains, which can support multiple access types of a multi-access environment.

A harmonized processing of authentications in any access type may be implemented by way of a common decentralized element. Thereby, authentication procedures in any access type of a multi-access environment may be harmonized.

A scalable solution for multi-access authentication may be provided, which is capable of handling a higher subscriber base, i.e. more users.

BRIEF DESCRIPTION OF THE DRAWINGS

The present invention is described herein below with reference to the drawings.

DETAILED DESCRIPTION OF THE DRAWINGS

Figure 1:
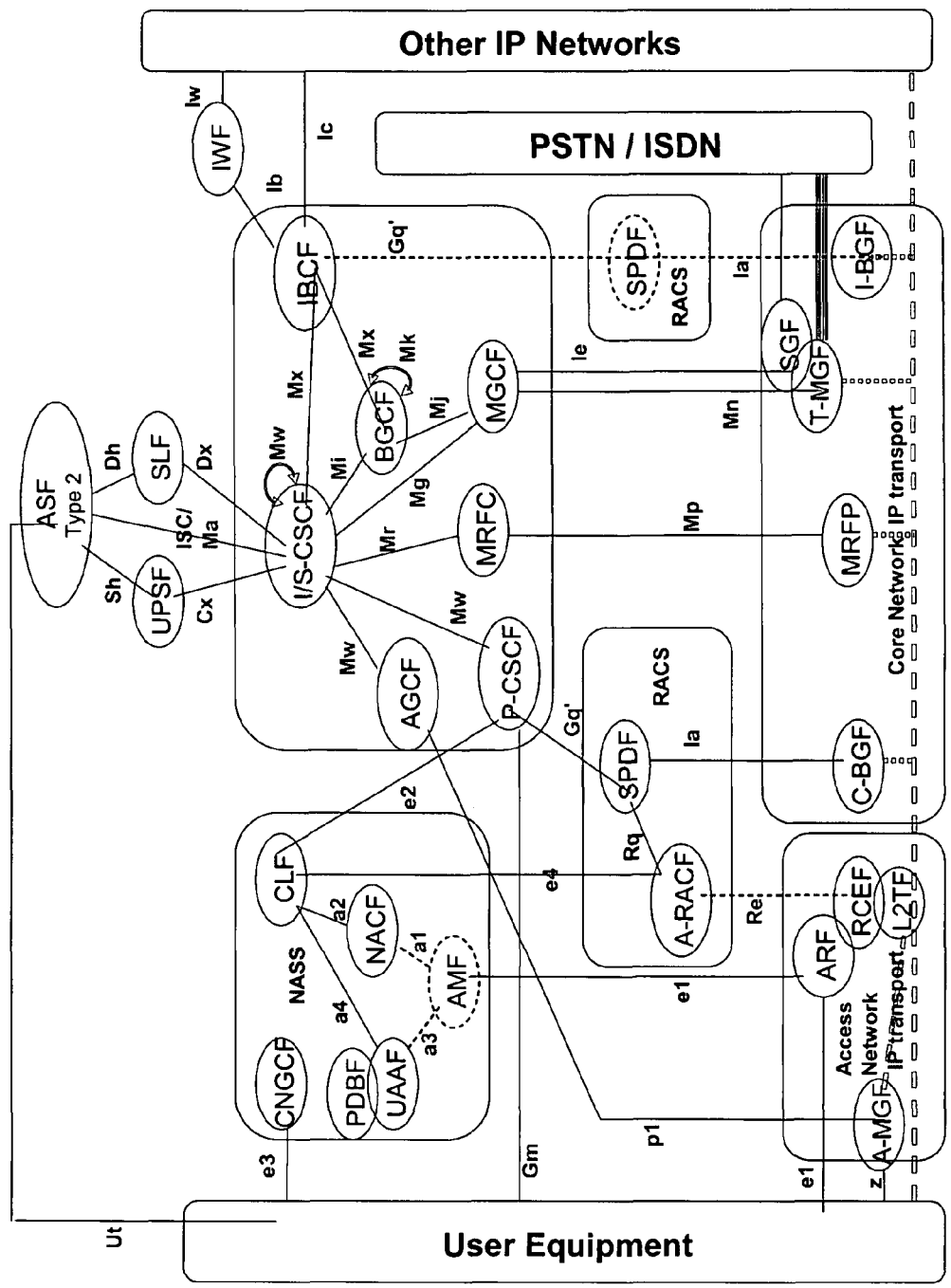
FIG. 1 shows a schematic overview of functions and interfaces of a network attachment subsystem (NASS) element as defined in current TISPAN specifications.

The present invention and exemplary embodiments thereof are described herein below with reference to the drawings representing particular non-limiting examples. A person skilled in the art will appreciate that the invention is not limited to these examples, and may be more broadly applied.

In particular, the present invention and its embodiments are described in relation to TISPAN and/or 3GPP examples. As such, the description of embodiments given herein specifically refers to terminology which is directly related to TISPAN and/or 3GPP. Such terminology is only used in the context of the presented examples, and does not limit the invention in any way. Rather, the present invention and its embodiments are likewise applicable both to TISPAN and 3GPP systems as well as to any other architecture of a multi-access environment. Furthermore, irrespective of specific examples given herein below, the present invention and its embodiments are applicable to any conceivable access type or technology, in particular those access types and technologies requiring authentication and authorization functionality.

Basically, it is to be noted that the present invention is based on a network attachment subsystem with extended functionality. In the following, such an extended network attachment subsystem (eNASS) is referred to as unified attachment solution (UAS).

Further to NASS functionality as described above, a unified attachment solution (UAS) underlying embodiments of the present invention covers other access types than those specified by current TISPAN or 3GPP standards. That is, an UAS element as used herein may for example be configured to provide access for at least one of 3GPP, WLAN (wireless local area network), DSL (digital subscriber line), Bluetooth®, WiMAX (worldwide interoperability for microwave access) and WiFi (wireless fidelity). From this enumeration, it is evident that the present invention is compatible for standards of the group known as IEEE 802.11X. Moreover, an UAS element as used herein may be configured to offer third party service providers a reliable mapping between user identity and IP address, and the possibility to query this mapping over a secure interface. This enables for the operator third party service selling without a need to authenticate separately to a service provider network. For details of implementation of an UAS element according to a present embodiment, reference is made to FIG. 4.

For the purpose of the present specification, the following acronyms are used in the meaning identified below. Namely, AAA stands for Authentication, Authorisation and Accounting, AC stands for Access Controller, AGCF stands for Access Gateway Control Function, AMF stands for Access Management Function, A-RACF stands for Access Resource Admission Control Function, ASN stands for Access Service Network, BGCF stands for Breakout Gateway Control Function, BRAS stands for Broadband Remote Access Server, BSC stands for Base Station Combiner/Controller, BSF stands for Bootstrapping Server Function, C-BGF stands for Core Border Gateway Function, CLF stands for Connectivity Session Location Repository Function, CNGCF stands for Customer Network Gateway Configuration Function, eNASS stands for extended Network Attachment Subsystem, HLR stands for Home Location Register, HSS stands for Home Subscriber System, I/S-CSCF stands for Interrogating/Serving Call State Control Function, IBCF stands for Interconnection Border Control Function, IMR stands for IP Multimedia Register, IWF stands for Inter-working Function, L2TF stands for Layer 2 Terminal Function, MGCF stands for Media Gateway Control Function, MRFC stands for Multimedia Resource Function Controller, MRFP stands for Multimedia Resource Function Processor, MSS stands for MSC Server, NACF stands for Network Address Authentication Function, NASS stands for Network Attachment Subsystem, NSR stands for Nokia Subscriber Data Repository, P-CSCF stands for Proxy Call Session Control Function, PDBF stands for Profile Database Function, RACF stands for Resource and Admission Control Subsystem, RACS stands for Resource Admission Control Subsystem, RCEF stands for Resource Control Enforcement Function, RNC stands for Radio Network Controller, SGF stands for Signalling Gateway Function, SGSN stands for Serving GPRS Support Node, SLF stands for Subscription Locator Function, SPDF stands for Service Policy Decision Function, T-MGF stands for Trunking Media Gateway Function, UAAF stands for User Access Authorization Function, UAS stands for Unified Attachment Solution, UNC stands for UMA Network Controller, and UPSF stands for User Profile Server Function.

Figure 2:
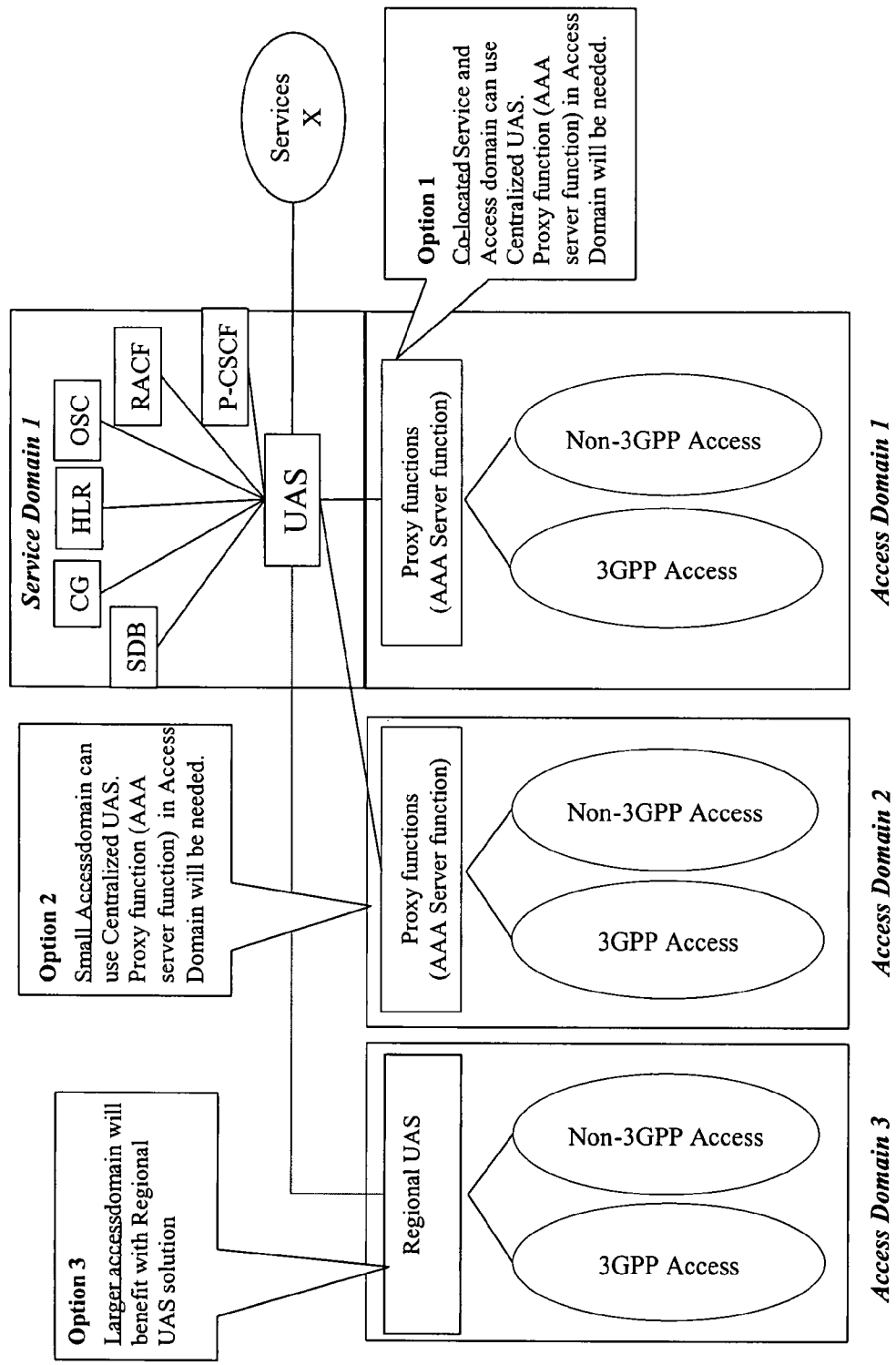
FIG. 2 shows a conceptual overview of a multi-access communication system, on which embodiments and aspects of the present invention may be applied.

FIG. 2 shows a conceptual overview of a multi-access communication system, on which embodiments and aspects of the present invention may be applied. According to FIG. 2, a core network part is denoted by service domain 1, in which, among others, a centralized unified attachment solution UAS is arranged. The centralized UAS in service domain 1 according to FIG. 2 basically corresponds to a network attachment subsystem (NASS) element as described above. The shown communication system exemplarily comprises three access domains, each of which is illustrated to have both 3GPP access capabilities (e.g. UMTS: Universal Mobile Telecommunications Standard) and non-3GPP access capabilities (e.g. TISPAN). It is noted that the communication system may comprise any number of access domains greater than one, and that any one of the access domains may have any combination of different access types as long as there are at least two accesses available in each access domain.

In FIG. 2, three options of the present invention are illustrated by way of example.

According to a first and a second option of the present invention, proxy functions (AAA Server function) are implemented in an access domain each (access domains 1 and 2 in FIG. 2). These proxy functions (AAA server function) are arranged in-between the multiple accesses of the respective access domain and the centralized UAS element in the core network. Accordingly, the proxy functions (AAA server function) of the first and second options of the present invention are configured and enabled to prevent access type changes from being visible in the core network. Nevertheless, the centralized UAS may be used for performing AAA and mobility management functions.

The first option is particularly beneficial for a case in which the access domain and the service domain are co-located. Thus, signaling delay is most likely acceptable in spite of signaling to the core network. The second option is particularly beneficial for a case in which the access domain concerned is a small access domain, either in terms of area and/or in terms of number of users. Thus, signaling load is most likely acceptable in spite of signaling to the core network.

In principal, the proxy functions (AAA server function) of the first and/or second options of the present invention may be realized at any network element in the respective access domain, as long as this network element has an interface/gateway to the core network.

According to a third option of the present invention, a decentralized ("regional") UAS is implemented in an access domain (access domain 3 in FIG. 2). This regional UAS element is thus arranged in-between the multiple accesses of the respective access domain and the centralized UAS element in the core network. Accordingly, the regional UAS element of the third option of the present invention is configured and enabled to prevent access type changes from being visible in the core network. Hence, the centralized UAS does not have to be used for exclusively performing AAA and mobility management functions. In detail, only the regional UAS of the respective access domain communicates with the centralized UAS in the service domain, not the user equipments requesting network attachment and/or authentication. In this option, network elements in the access domain with regional UAS need to be configured for the regional UAS.

This option is particularly beneficial for a case in which the access domain concerned is a large access domain, either in terms of area and/or in terms of number of users, irrespective of being co-located with the service domain or not. Thereby, signaling load and signaling delay may be reduced because of only reduced signaling to the core network being performed.

Although the first and second options described above are capable of achieving the object underlying the present invention as well, the subsequent description will hereinafter focus on option 3 according to FIG. 2. Due to its basic configuration as outlined above, option 3 is also referred to as a concept of regional authentication for any access of a multi-access environment.

Figure 3:
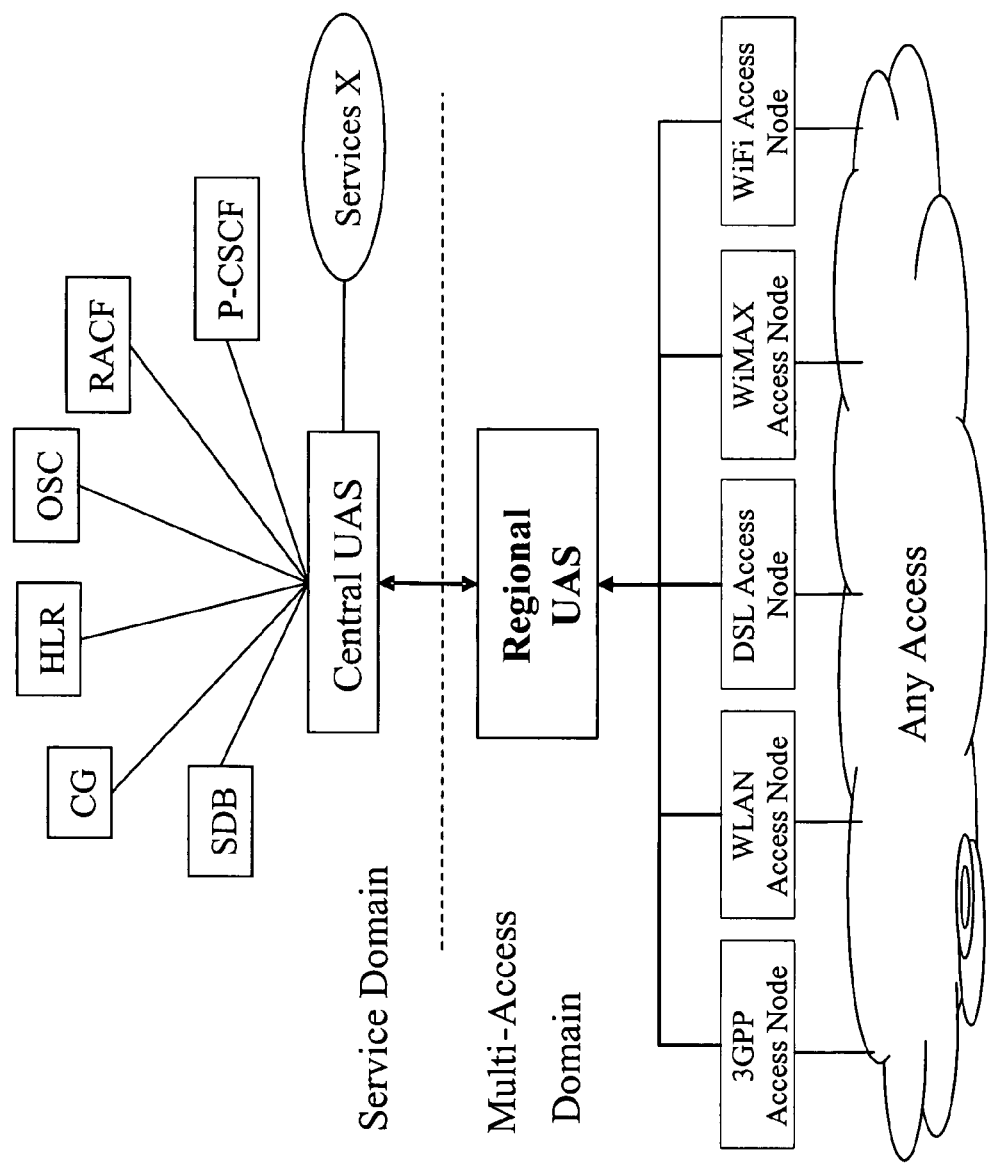
FIG. 3 shows a schematic illustration of a multi-access authentication architecture according to an embodiment of the present invention.

FIG. 3 shows a schematic illustration of a multi-access authentication architecture according to an embodiment of the present invention. The illustration of FIG. 3 may be understood as a section of the overall system overview of FIG. 2.

According to the embodiment shown in FIG. 3, a regional UAS element is arranged in a multi-access domain and is connected to a plurality of access nodes thereof. Each access node is configured for another type of access of the multi-access domain, e.g. 3GPP, WLAN, DSL, WiMAX and WiFi, as exemplarily illustrated. By way of these different access nodes, a user equipment (UE) or customer premises equipment (CPE) may access the communication system through the different access types (denoted by "any access" in FIG. 3). The regional UAS is connected with the centralized UAS in the service or core network domain, which in turn is connected to different known functions of the core network (denoted by SDB, CG, HLR, OSC, RACF and P-CSCF in FIG. 3). The centralized UAS is further ("logically") connected to different services being provided (denoted by "services X" in FIG. 3).

It is to be noted that moving to any access, as indicated in FIG. 3, needs EAP-SIM (Extensible Authentication Protocol Method for GSM Subscriber Identity) and/or EAP-AKA (Extensible Authentication Protocol Method for UMTS Authentication and Key Agreement) authentication to local/regional UAS.

According to an embodiment of the present invention, the regional attachment element UAS has a user profile comprising an IMSI (International Mobile Subscriber Identity), user name, password and device MAC (media access control) address in a dynamic database. Otherwise, it obtains a full user profile for the respective user from the central UAS. The regional attachment element UAS according to embodiments of the present invention comprises and/or implements at least one of a configuration server such as a DHCP server, an authentication server such as a RADIUS server, a session engine and a session database.

The regional UAS or the regional authentication architecture/system is, according to embodiments of the present invention, configured to perform at least one of the following procedures: network entry authentication (when a user enters the network for the first time), periodic authentication (based e.g. on a RADIUS timer e.g. in the regional UAS), intra-access mobility (in case of a handover between access nodes within the same access domain), inter-access mobility (in case of a handover changing the access type/domain), and/or service-based authentication.

The regional UAS is, according to embodiments of the present invention, configured to communicate with the centralized UAS (for example by way of open TISPAN interface A2 and/or A4) for at least one of the following functions/operations: network entry authentication, fetching a user profile, updating a session database, updating location information, handling/obtaining authentication vectors for fast authentication, service authentication, and/or quality-of-service (QoS) and accounting information.

It is to be noted that the method steps and operations, which are described above and/or below to be performed by the regional/local UAS, may be performed by any one of the shown functional blocks, or by a processor thereof (not shown).

From point of view of a method, the concept of regional authentication comprises among others that, once a user enters to any access type in a region/domain, a full authentication procedure will be carried out. A regional UAS will request a central UAS for authentication. During initial authentication, central UAS provides the list of authentication vectors to the regional UAS. All access nodes in a region/domain will communicate to the local UAS (not to the central UAS) to authenticate the user.

Figure 4:
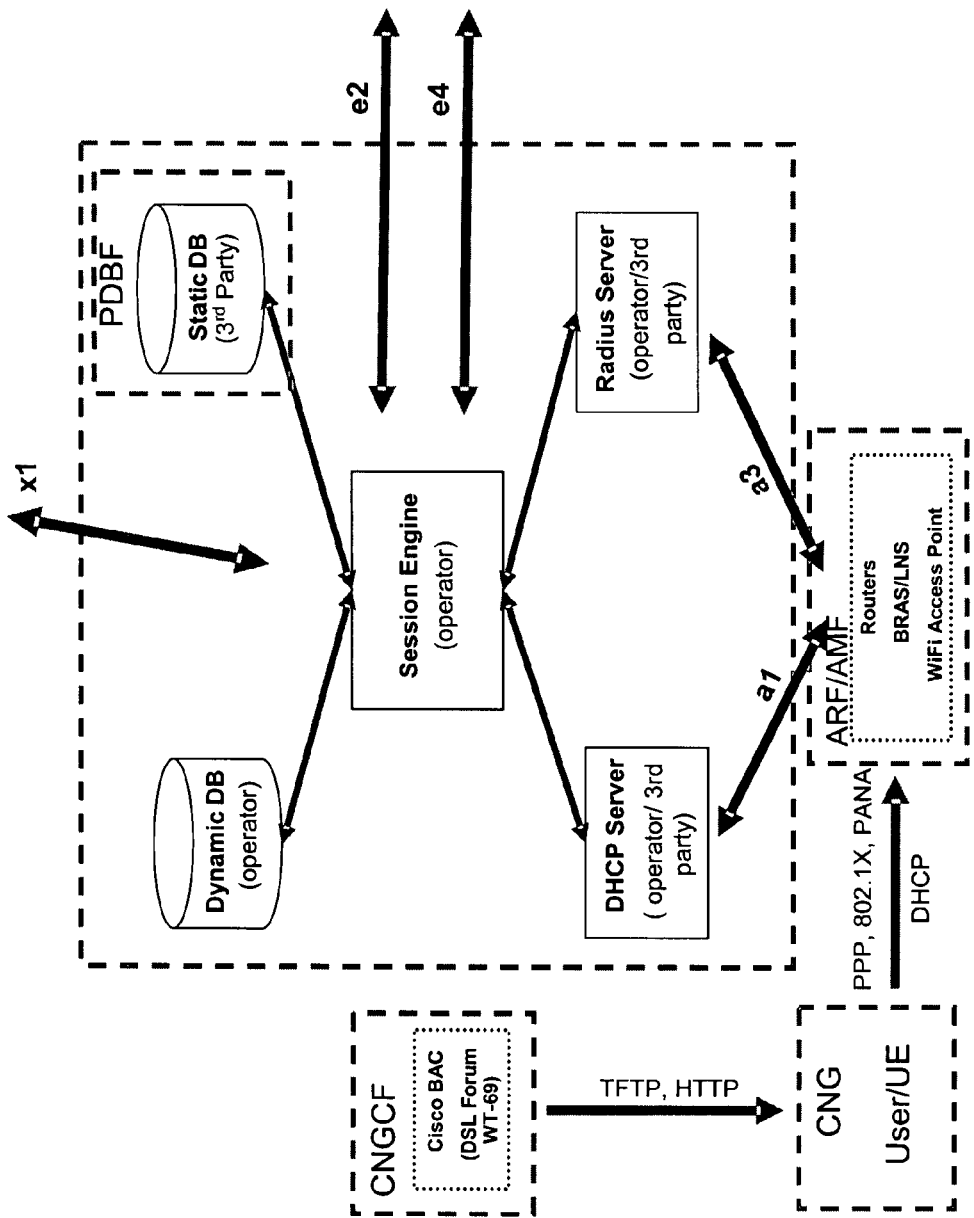
FIG. 4 shows a schematic block diagram of (logical) functions of a unified attachment solution according to an embodiment of the present invention.

FIG. 4 shows a schematic block diagram of (logical) functions of a unified attachment solution according to an embodiment of the present invention. The UAS element shown in FIG. 4 may constitute both the centralized UAS and the regional UAS of FIG. 3.

According to the embodiment shown in FIG. 4, the (regional) UAS comprises a DHCP server (of an operator or a third party), a RADIUS server (of an operator or a third party), a session engine (of an operator), a dynamic database (of an operator) and a static database of a profile database function (of a third party). The (regional) UAS has interfaces e2 and/or e4 to the core network and the resource admission control subsystem (cf. FIG. 1 above). According to the underlying illustrative example, the interface e2 connects the UAS (in particular the CLF block thereof) with a P-CSCF element of the core network, and the interface e4 connects the UAS (in particular the CLF block thereof) with an A-RACF element of the RACS network part. Further, an interface x1 provides a gateway from the UAS to a service control and application plane, i.e. for example to services on the core domain (which are illustrated in FIGS. 2 and 3 as "Services X"). The x1 interface is also used for location management.

It is to be noted that a (regional) UAS according to embodiments of the present invention may also comprise any combination of the above-mentioned functions, and does not have to comprise all of them.

A user equipment UE comprises a customer network gateway CNG, receives data from a customer network gateway control function CNGCF, forwards data to an access management function ARF/AMF, thus connecting to the (regional) UAS via interface a1 and/or a3 (cf. FIG. 1 above).

Although the aspects of the present invention are described above mainly with respect to devices, elements and systems from a structural point of view, the present invention as a matter of course also covers respective methods and operations performed by these devices, element and systems. Such methods and operations may of course be implemented by way of software and/or hardware.

Figure 5:
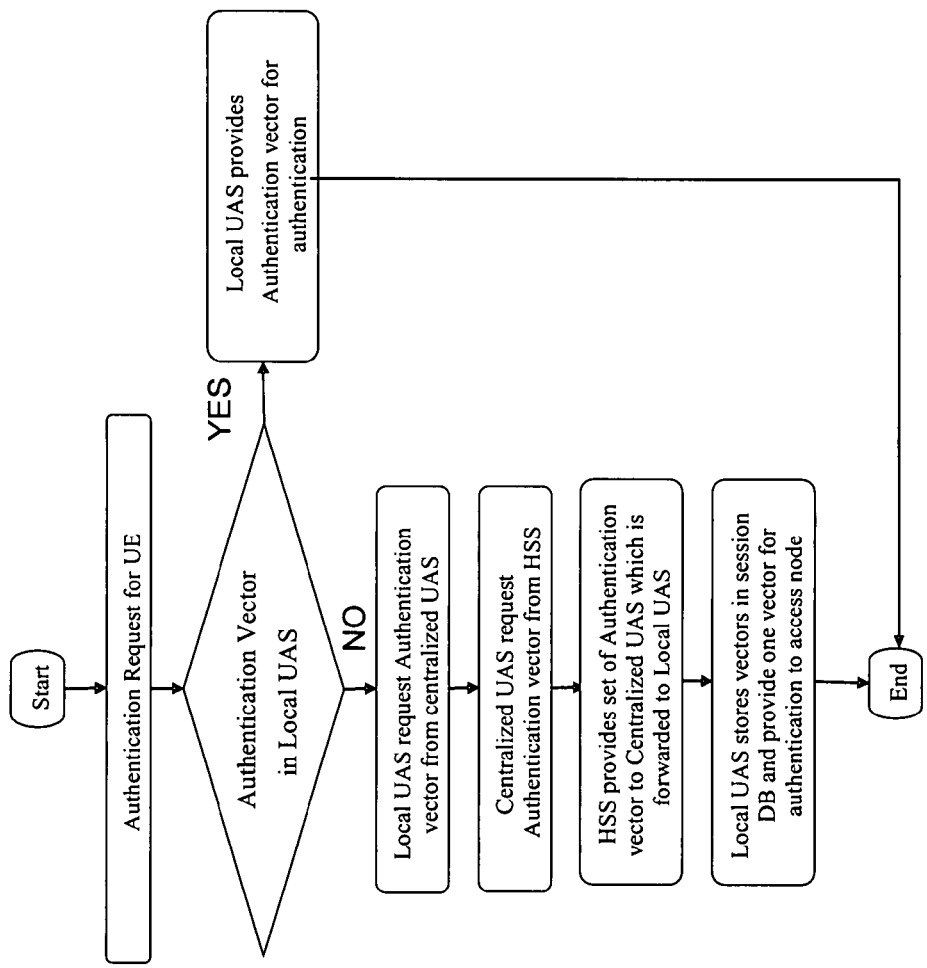
FIG. 5 shows a flow diagram of an authentication procedure according to an embodiment of the present invention.

FIG. 5 shows a high-level flow diagram of an authentication procedure according to an embodiment of the present invention.

According to the embodiment shown in FIG. 5, a user equipment UE sends an authentication request to the regional UAS in the access domain concerned (first step). In a second step, the regional UAS checks whether an authentication vector for the requested authentication (i.e. user) is present in the regional UAS. If so (i.e. YES), the regional UAS provides the authentication vector for the authentication of the user, whereby the authentication may be performed without communication with the centralized UAS. If the authentication vector is not locally present (i.e. NO), the regional UAS requests a respective authentication vector from the centralized UAS. Upon request, the centralized UAS requests the authentication vector in a next step from the HSS at the core network or service domain. In a subsequent step, the HSS returns the requested authentication vector to the centralized UAS, which in turn forwards this authentication vector to requesting regional UAS in the respective access domain. Then, the regional UAS stores the forwarded authentication vector in a session database and provides the same for authentication to an access node, via which the requesting UE is connected to the regional UAS. Thereby, the authentication of the requesting user is completed.

It is evident from the flow diagram of FIG. 5 that, according to the present embodiment, a full authentication is performed if necessary (i.e. NO in the second step), whereas a fast authentication is performed if possible (i.e. YES in the second step).

Figure 6:
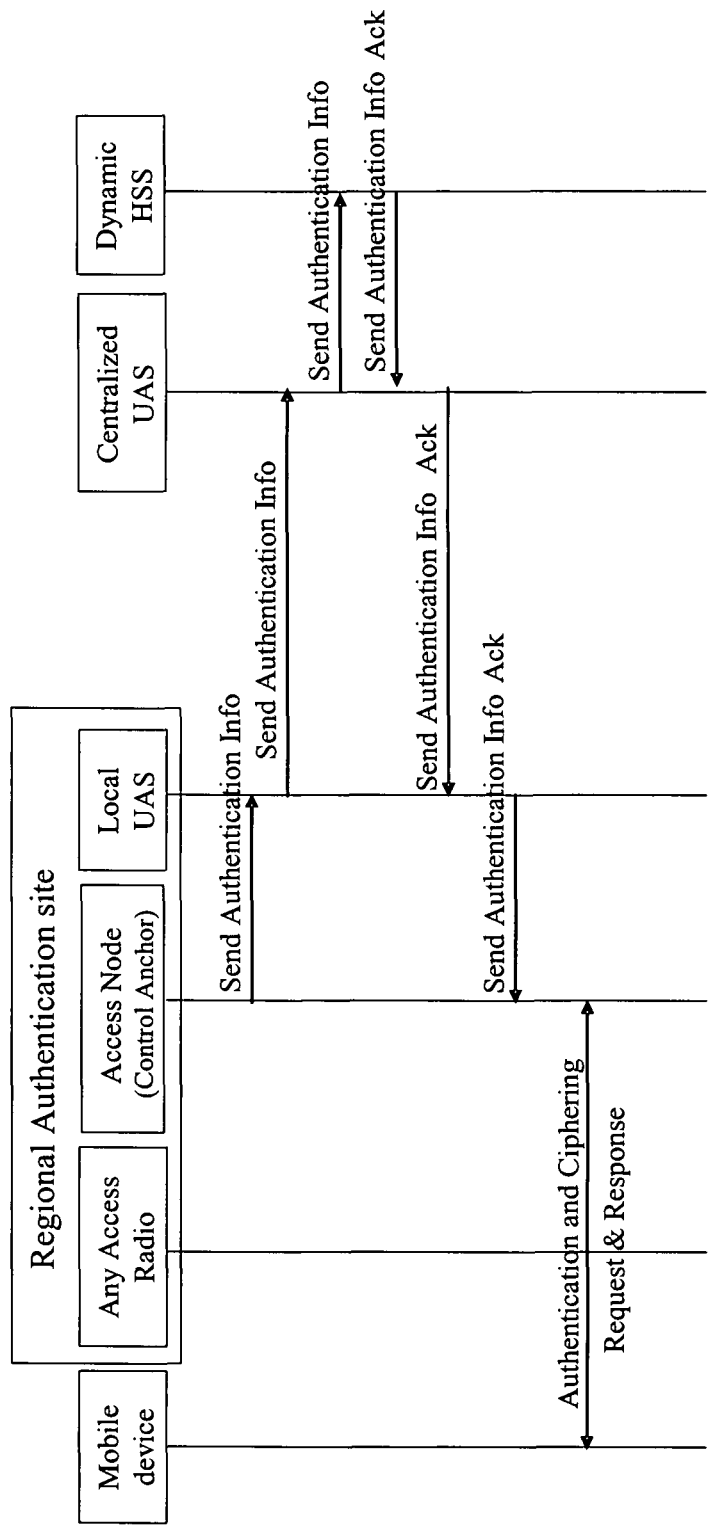
FIG. 6 shows a signaling diagram of a full authentication procedure according to an embodiment of the present invention.

FIG. 6 shows a signaling diagram of a full authentication procedure according to an embodiment of the present invention. That is, the authentication procedure shown in FIG. 6 may especially be performed in a network entry case, i.e. when a user enters a network for the first time. In this, a full authentication by using the centralized UAS is needed, even if a regional UAS exists.

The physical attachment procedure of the user equipment (exemplarily denoted by mobile device in FIG. 6) is not shown in FIG. 6, but assumed to be completed.

Initially, according to the present embodiment, an access node (control anchor) of an access domain requests authentication vectors (or one authentication vector) from a regional UAS to authenticate the user of the mobile device (illustrated by "Send Authentication Info"). Then, the regional UAS checks for authentication vector in its session database. If not available, it sends for example a "Send Authentication Info" message to a centralized UAS in the core network or service domain. The centralized UAS forwards the request message to a dynamic HSS of the core network or service domain. Upon receipt of this message, the dynamic HSS responds with a "Send Authentication Info Ack" message including an authentication vector to the centralised UAS, e.g. in the form of an ordered array of quintets. Each quintet contains keying material such as RAND, XRES, AUTN, CK, and IK. The centralized UAS then forwards the response from the HSS to the regional UAS by way of a "Send Authentication Info Ack" message. The regional UAS provides an authentication vector to the access node originally requesting authentication, and stores the rest of the vectors (if any) for future authentication procedures. At authentication, the access node uses a quintet and transmits the RAND, AUTN and KSI, that belong to this quintet, to the mobile device (i.e. the user) in the "Authentication and Ciphering Request" message. By way of a respective response from the mobile device, the user is authenticated.

Figure 7:
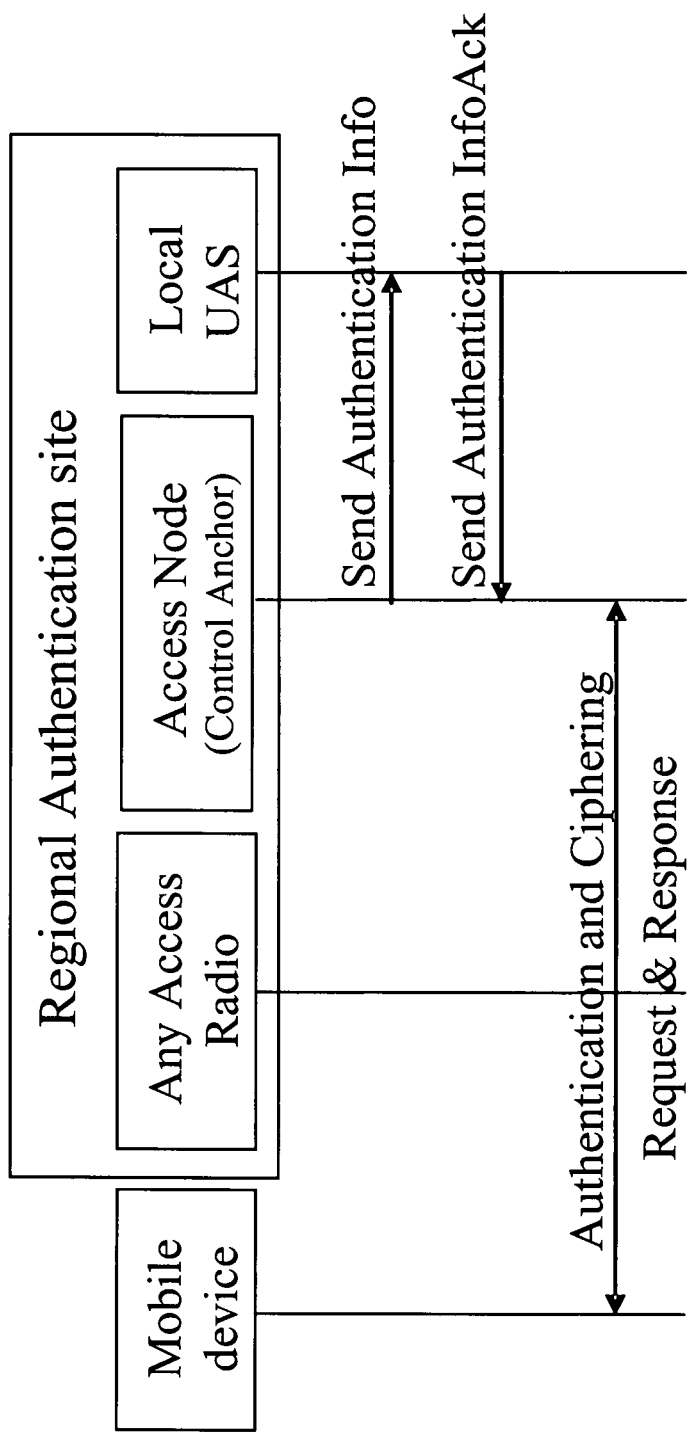
FIG. 7 shows a signaling diagram of a fast authentication procedure according to an embodiment of the present invention.

FIG. 7 shows a signaling diagram of a fast authentication procedure according to an embodiment of the present invention. That is, the authentication procedure shown in FIG. 7 may especially be performed in a case where the regional UAS has available an applicable authentication vector, i.e. in cases other than a network entry case.

The physical attachment procedure of the user equipment (exemplarily denoted by mobile device in FIG. 6) is not shown in FIG. 6, but assumed to be completed.

Initially, according to the present embodiment, an access node (control anchor) requests authentication vectors from a regional UAS to authenticate the user, which is for example done by means of a "Send Authentication Info" message. The regional UAS checks for authentication vector in its session database. If available, it sends s "Send Authentication Info Ack" message with one authentication vector to the requesting access node. At authentication, the access node uses a quintet thereof and transmits the RAND, AUTN and KSI, that belong to this quintet, to the mobile device (i.e. the user) in the "Authentication and Ciphering Request" message. By way of a respective response from the mobile device, the user is authenticated.

Although described above with respect to certain terms such as network attachment subsystem (NASS) or unified attachment solution (UAS), the present invention is not limited to devices and/or systems with this denomination. Rather, these terms merely serve for illustrative purpose. The present invention and all its aspects and options may as well be applied to any other network element providing similar or equivalent functions, regardless of its name.

In general, it is to be noted that respective functional elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Furthermore, method steps and functions likely to be implemented as software code portions and being run using a processor at one of the entities are software code independent and can be specified using any known or future developed programming language such as e.g. Java, C++, C, and Assembler. Method steps and/or devices or means likely to be implemented as hardware components at one of the peer entities are hardware independent and can be implemented using any known or future developed hardware technology or any hybrids of these, such as MOS, CMOS, BiCMOS, ECL, TTL, etc, using for example ASIC components or DSP components, as an example. Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to those skilled in the art.

Generally, for the purpose of the present invention as described herein above, it should be noted that a communication device or terminal may for example be any device by means of which a user may access a network and/or a server of such network; this implies mobile as well as non-mobile devices and networks, independent of the technology platform on which they are based; only as an example, it is noted that terminals operated according to principles standardized by the $3^{rd}$ Generation Partnership Project 3GPP and known for example as UMTS terminals (Universal Mobile Telecommunication System) are particularly suitable for being used in connection with the present invention, nevertheless terminals conforming to standards such as GSM (Global System for Mobile communications) or IS-95 (Interim Standard 95) may also be suitable;

networks referred to in this connection may comprise mobile and fixed network sections independent of the type of technology on which the networks are operated, for example those networks operate on the basis of the Internet Protocol IP, independent of the protocol version (IPv4 or IPv6), or on the basis of any other packet protocol such as User Datagram Protocol UDP, etc.

devices can be implemented as individual devices, devices may also be implemented as a module configured to accomplish interoperability with other modules constituting an entire apparatus, e.g. a module device may be represented as a chipset or chip card e.g. insertable and/or connectable to an apparatus such as a mobile phone, or a module may be realized by executable code stored to a mobile phone or other device for execution upon invocation.

In summary, there is disclosed a solution for multi-access authentication in communication systems. According to the presented solution, a local attachment element in an access domain is configured to perform a fast authentication procedure without involving a centralized attachment element in a core network domain. Stated in other words, there is provided a regional authentication concept for any access in a multi-access environment.

Even though the invention is described above with reference to the examples according to the accompanying drawings, it is clear that the invention is not restricted thereto. Rather, it is apparent to those skilled in the art that the present invention can be modified in many ways without departing from the spirit and scope of the inventive idea as disclosed herein above and/or in the appended claims.

The invention as claimed is:

1. A method comprising:
   receiving at a regional attachment element a first authentication request from a user equipment via a first access node of an access domain;
   checking at the regional attachment element whether required authentication material for authentication is locally present in the access domain where the authentication is requested, in response to receiving the first authentication request;
   performing a full authentication procedure involving communication between the regional attachment element and a centralized attachment element and storing the required authentication material, in response to determining that the required authentication material is not locally present;
   receiving at the regional attachment element a second authentication request only from the user equipment via a second access node of the access domain and directly to the regional attachment element, the second access node being independent of the first access node and located in the access domain;
   checking at the regional attachment element whether the authentication material required for authentication is locally present in the access domain where the authentication is requested, in response to receiving the second authentication request; and
   performing a fast authentication procedure not involving the centralized attachment element, in response to determining that required authentication material is locally present;
   where the first access node uses a first type of access and the second access node uses a different, second type of access.

2. The method of claim 1, wherein the fast authentication procedure is performed by the local attachment element of the access domain where authentication is requested.

3. The method of claim 2, wherein the local attachment element uses authentication material for performing the fast authentication procedure, which has been previously received from the centralized attachment element during a previous full authentication procedure.

4. The method of claim 1, wherein the fast authentication procedure is access and mobility related.

5. The method of claim 1, wherein the required authentication material is an authentication vector.

6. The method of claim 1, wherein the full authentication procedure is performed upon first-time network entry of the user equipment.

7. The method of claim 1, wherein the fast authentication procedure is performed for the user equipment for at least one of periodic authentication, an intra-access handover, an inter-access handover, and service-based authentication.

8. The method of claim 1, further comprising use of at least one of an extensible authentication protocol method for global system for mobile communication subscriber identity and an extensible authentication protocol method for universal mobile telecommunications standard authentication and key agreement authentication towards the local attachment element.

9. The method of claim 1, wherein the method is applicable in at least one of a telecommunication and internet converged services and protocols for advanced networking and a third generation partnership project network environment.

10. The method of claim 1, wherein the method is configured for authentication in a multi-access environment.

11. A system comprising:
    a centralized attachment element located in a core domain; and
    a local attachment element located in an access domain and configured to interface with a user equipment via a first access node of an access domain and via a second access node of the access domain to receive a request for authentication, wherein the local attachment element is further configured to interface with the centralized attachment element directly and via a single communication link and where the first access node uses a first type of access and the second access node uses a different, second type of access,
    said local attachment element further configured:
    to receive a first authentication request from the user equipment via the first access node;
    to determine whether authentication material required for authentication of the user equipment is locally present in the access domain where the authentication is requested and to store the required authentication material, in response to receiving the first authentication request,
    to perform a full authentication procedure involving the centralized attachment element, in response to determining that the required authentication material is not locally present,
    to receive a second authentication request from the user equipment via the second access node and directly to the local attachment element, the second access node being independent of the first access node and located in the access domain;
    to determine whether the authentication material required for authentication of the user equipment is locally present in the access domain where the authentication is requested, in response to receiving the second authentication request, and
    to perform a fast authentication procedure not involving the centralized attachment element but involving the local attachment element, in response to determining that the required authentication material is locally present.

12. The system of claim 11, wherein the local attachment element uses authentication material for performing the fast authentication procedure, which has been previously received from the centralized attachment element during a previous full authentication procedure.

13. The system of claim 11, wherein the local attachment element comprises at least one of a configuration server, an authentication server, a session engine, and a session database.

14. The system of claim 11, wherein the local attachment element is comprised of a network attachment subsystem or a unified attachment solution or an authentication, authorization and accounting server.

15. The system of claim 11, wherein the local attachment element is connected to a plurality of access nodes.

16. The system of claim 15, wherein the access nodes are configured to provide access by at least one of 3GPP, WLAN, DSL, Bluetooth®, WiMAX, WiFi, or any other access in accordance with IEEE 802.11x.

17. The system of claim 11, further configured to perform authentication, authorization and accounting functions and mobility management functions in a decentralized manner.

18. The system of claim 11, wherein the system is configured for authentication in a multi-access environment.

19. A user equipment, which is configured to be authenticated in a system in accordance with claim 11.

20. An apparatus, comprising:
at least one processor configured to execute software code, said apparatus configured to act as a local attachment element and to interface with a centralized attachment element located in a core domain, said apparatus having a first interface for interfacing with at least two access nodes of an access domain to receive to a request for authentication from a user equipment, where the at least two access nodes comprises a first access node which uses a first type of access and a second access node which uses a different, second type of access, and further comprising a second interface for interfacing with the centralized attachment element, where said at least one processor and software code cause the apparatus:
to receive a first authentication request from the user equipment over said first interface via the first access node,
to determine whether authentication material required for authentication is locally present at the apparatus, in response to receiving the first authentication request,
to perform a full authentication procedure involving communication with the centralized attachment element over said second interface and to store the required authentication material, in response to determining that the required authentication material is not locally present at the apparatus,
to receive a second authentication request only from the user equipment via the second access node of the access domain and directly to the local attachment element, the second access node being independent of the first access node and located in the access domain,
to determine whether the authentication material required for authentication is locally present at the apparatus, in-response to receiving the second authentication request, and
to perform a fast authentication procedure not involving communication with the centralized attachment element in response to determining that the required authentication material is locally present at the apparatus.

21. The apparatus of claim 20, further configured to perform authentication, authorization and accounting functions and mobility management functions in a decentralized manner.

22. The apparatus of claim 20, further configured to use authentication material for performing the fast authentication procedure, which has been previously received from the Centralized attachment element during a previous full authentication procedure.

23. The apparatus of claim 20, comprising at least one of a configuration server, an authentication server, a session engine, and a session database.

24. The apparatus of claim 20, further configured to be, comprise or be comprised of a network attachment subsystem or a unified attachment solution or an authentication, authorization and accounting server.

25. The apparatus of claim 20, further configured to be connected to a plurality of access nodes, wherein the access nodes are configured to provide access by at least one of 3GPP, WLAN, DSL, Bluetooth®, WiMAX, WiFi, or any other access in accordance with IEEE 802.11x.

26. The apparatus of claim 20, wherein the apparatus is configured for authentication in a multi-access environment, and wherein the apparatus is located in an access domain thereof.

27. A non-transitory computer-readable medium that stores a computer program executable by at least one processor, the computer program being configured to perform:
receiving at a regional attachment element a first authentication request from a user equipment via a first access node of an access domain;
checking at the regional attachment element whether required authentication material for authentication is locally present in the access domain where the authentication is requested, in response to receiving the first authentication request;
performing a full authentication procedure involving communication between the regional access attachment and a centralized attachment element and storing the required authentication material, in response to determining that the required authentication material is not locally present;
receiving at the regional attachment element a second authentication request only from the user equipment via a second access node of the access domain and directly to the regional attachment element, the second access node being independent of the first access node and located in the access domain;
checking at the regional attachment element whether the authentication material required for authentication is locally present in the access domain where the authentication is requested, in response to receiving the second authentication request; and
performing a fast authentication procedure not involving the centralized attachment element, in response to determining that the required authentication material is locally present;
where the first access node uses a first type of access and the second access node uses a different, second type of access.

28. An apparatus, comprising:
at least one processor configured to execute software code, said apparatus configured to function as a local attachment element and to interface with a centralized attachment element located in a core domain, said apparatus having a first interface for interfacing with a plurality of access nodes located in a plurality of access domains, at least two of said access domains being associated with different types of wireless access technologies, said apparatus further configured to receive to a request for authentication from a user equipment via an access node in one said access domains, said apparatus further comprising a second interface for interfacing with the centralized attachment element, where said at least one processor and software code cause the apparatus:
to receive a first authentication request from the user equipment via a first access node of the plurality of access nodes over said first interface,
to determine whether authentication information required for authentication of the user equipment is locally present at the apparatus, where the authentication information, if locally present, was previously received from the centralized attachment element during a previous full authentication procedure for the user equipment, in response to receiving the first authentication request, to perform the full authentication procedure involving communication with the centralized attachment element over said second interface, and storing the required authentication material, in response to determining that the required authentication information is not locally present at the apparatus, to receive a second authentication request only from the user equipment via a second access node of the plurality of access nodes over said first interface and directly to the local attachment element, the second access node being independent of the first access node and located in the same access domain as the first access node;

to determine whether authentication information required for authentication of the user equipment is locally present at the apparatus, in response to receiving the second authentication request, and to perform a fast authentication procedure not involving communication with the centralized attachment element in response to determining that the required authentication information is locally present at the apparatus, where the first access node being associated with a first type of wireless access technology and the second access node being associated with a different second type of wireless access technology.

29. The apparatus of claim 28, further configured to perform authentication, authorization and accounting functions and mobility management functions in a decentralized manner.

30. The apparatus of claim 28, where at least one of the plurality of access domains operates in accordance with a cellular wireless access technology.

31. The apparatus of claim 30, where at least one other one of the plurality of access domains operates in accordance with a non-cellular wireless access technology, including an IEEE 802.11x wireless access technology.

32. The method of claim 1, wherein the full authentication procedure comprises receiving at least one authentication vector with respect to a decentralized unified attachment solution, where the at least one authentication vector is not generated with respect to a specific access type.

* * * * *